(12) United States Patent
Nathan

(10) Patent No.: US 9,134,751 B2
(45) Date of Patent: Sep. 15, 2015

(54) TIME KEEPING IN UNKNOWN AND UNSTABLE CLOCK ARCHITECTURE

(75) Inventor: Ofer Nathan, Haifa (IL)

(73) Assignee: Intel Corporation, Santa Clara, CA (US)

(*) Notice: Subject to any disclaimer, the term of this patent is extended or adjusted under 35 U.S.C. 154(b) by 649 days.

(21) Appl. No.: 13/435,992

(22) Filed: Mar. 30, 2012

(65) Prior Publication Data

US 2013/0262910 A1   Oct. 3, 2013

(51) Int. Cl.
*G06F 1/04* (2006.01)
*G06F 1/14* (2006.01)
*G06F 1/08* (2006.01)
*G06F 11/16* (2006.01)
*H04J 3/06* (2006.01)

(52) U.S. Cl.
CPC .. *G06F 1/14* (2013.01); *G06F 1/08* (2013.01); *G06F 11/1658* (2013.01); *H04J 3/0655* (2013.01)

(58) Field of Classification Search
CPC ......... G06F 1/14; G06F 1/08; G06F 11/1658; H04J 3/0655
See application file for complete search history.

(56) References Cited

U.S. PATENT DOCUMENTS

| | | | |
|---|---|---|---|
| 6,941,482 B2* | 9/2005 | Strong | 713/400 |
| 7,362,773 B2* | 4/2008 | Azenko et al. | 370/432 |
| 8,233,506 B2* | 7/2012 | Glass | 370/503 |
| 8,266,271 B2* | 9/2012 | Oyadomari et al. | 709/224 |
| 2007/0239972 A1* | 10/2007 | Orita et al. | 712/226 |
| 2009/0222684 A1* | 9/2009 | Serebrin | 713/400 |

* cited by examiner

*Primary Examiner* — M Elamin
(74) *Attorney, Agent, or Firm* — Kenyon & Kenyon LLP

(57) ABSTRACT

The present invention may provide a system with a fixed clock to provide a fixed clock signal, and a variable clock to provide a variable clock signal. The system may also include a chipset with a chipset time stamp counter (TSC) based on the fixed clock signal. A processor may include a fast counter that may be based on the variable clock signal and generate a fast count value. A slow counter may download a time stamp value based on the chipset TSC at wakeup. The slow counter may be based on the fixed clock signal and may generate a slow count value. A central TSC may combine the fast count and slow count value to generate a central TSC value.

18 Claims, 6 Drawing Sheets

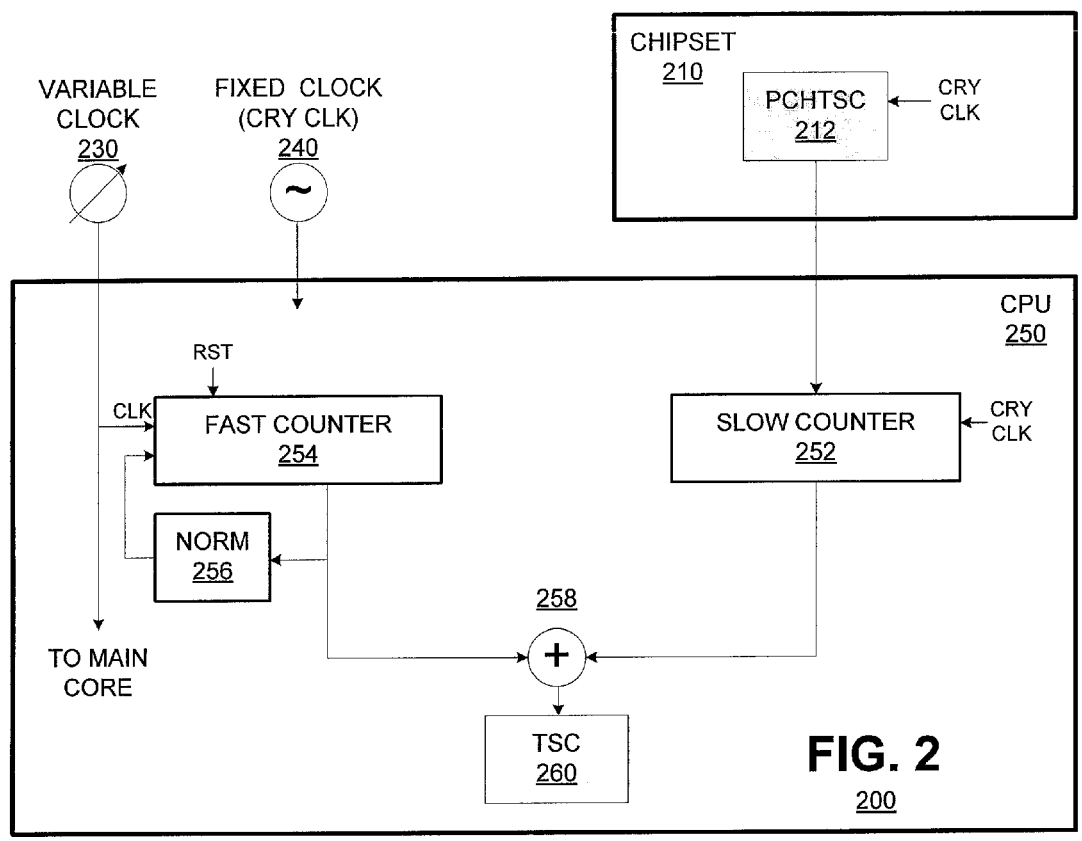
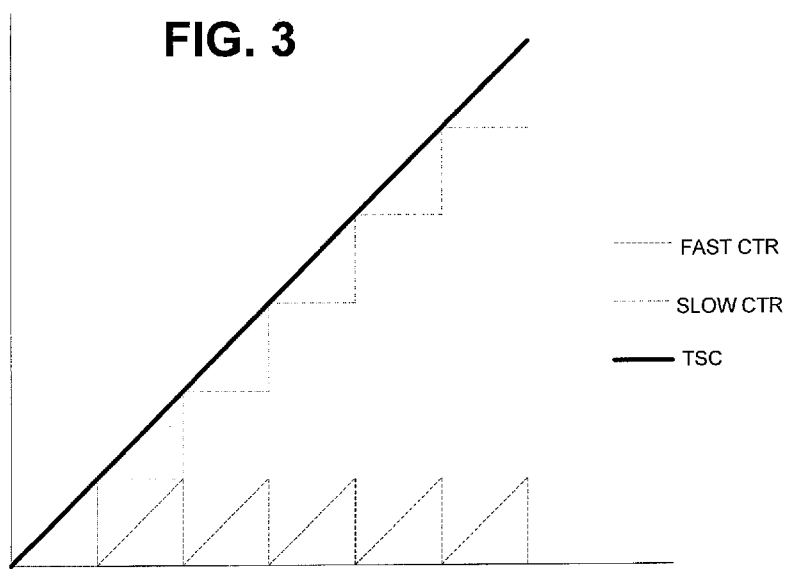

TIME KEEPING IN UNKNOWN AND UNSTABLE CLOCK ARCHITECTURE

FIELD OF THE INVENTION

The present disclosure relates to processor time keeping and in particular to time-stamp counters.

BACKGROUND

Contemporary processor architectures define a time-stamp counter (TSC) mechanism to monitor and identify relative time occurrence of processor events. A TSC typically counts the maximum number of guaranteed clock ticks since the most recent central processing unit (CPU) reset. Hence, a TSC is advantageous for system timekeeping and for applications that check time frequently in their operations such as operating systems.

With the increasing use of TSCs, consistent and accurate TSC operations are becoming paramount. To improve consistency and accuracy, some contemporary processors include a TSC in the chipset, from which a counter in a coupled CPU core downloads a value at power transition times. For example, the CPU core can download the chipset TSC count value at wake up times.

However, CPU counters generally operate on a spread, variable (unstable) clock while chipsets generally operate on a non-spread, fixed (stable) clock. This difference leads to counting inconsistencies especially between CPU counters and other counters. For most applications, especially operating systems, this discrepancy and run-time changes of the TSC are not acceptable because the applications use the TSC to compute their respective operating frequencies.

Therefore, the inventor recognized a need in the art for a more reliable time keeping technique in an unstable clock environment.

DESCRIPTION OF THE FIGURES

FIG. 2 illustrates a simplified block diagram of a processor according to an embodiment of the present invention.

FIG. 3 illustrates exemplary counter signals according to an embodiment of the present invention.

DETAILED DESCRIPTION

Figure 1:
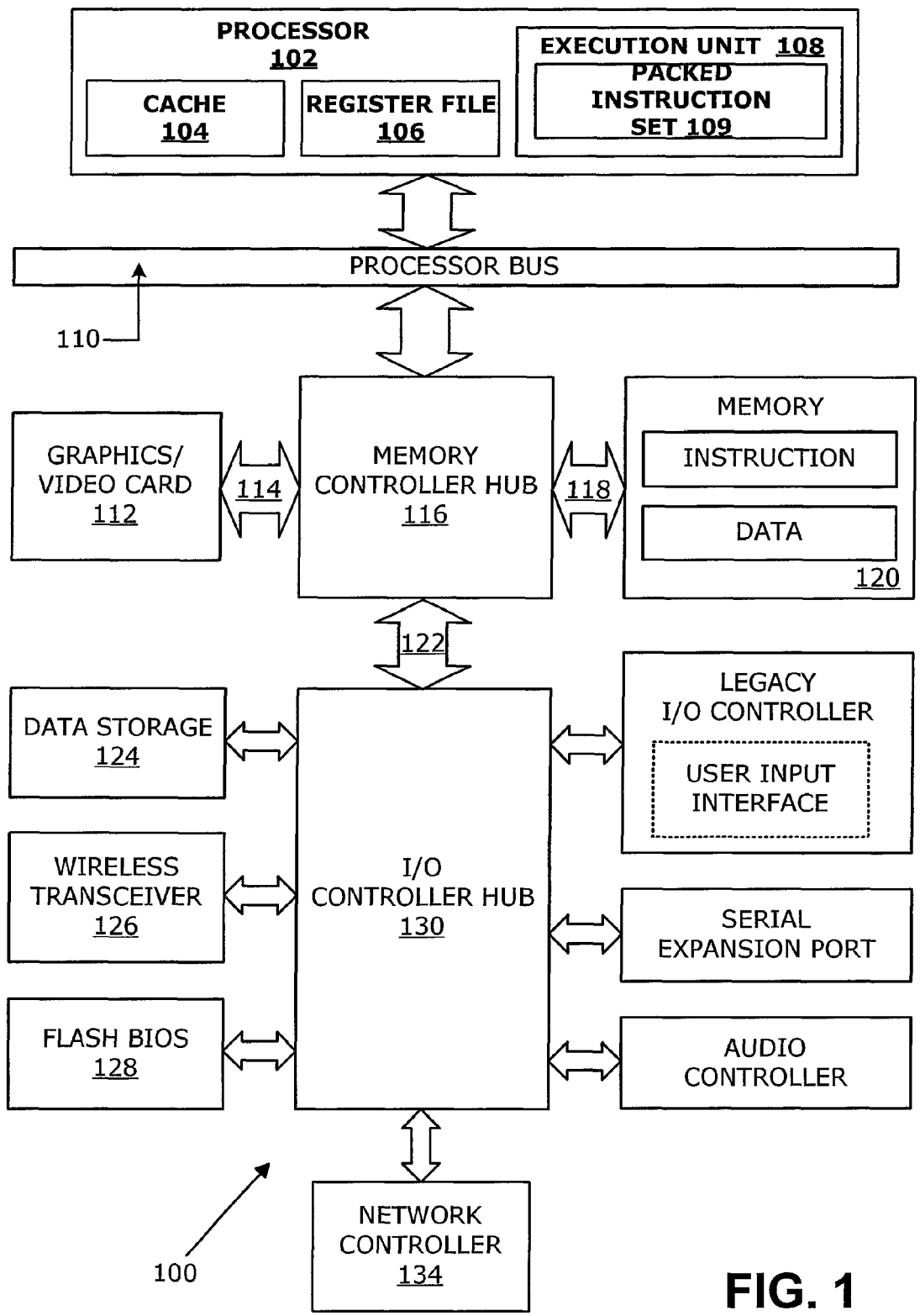
FIG. 1 illustrates a simplified block diagram of a system according to an embodiment of the present invention.

The present invention may provide a system with a fixed clock to provide a fixed clock signal, and a variable clock to provide a variable clock signal. The system may also include a chipset with a chipset time stamp counter (TSC) based on the fixed clock signal. A processor may include a fast counter that may be based on the variable clock signal and generate a fast count value. A slow counter may download a time stamp value based on the chipset TSC at wakeup. The slow counter may be based on the fixed clock signal and may generate a slow count value. A central TSC may combine the fast count and slow count value to generate a central TSC value.

In the following description, numerous specific details such as processing logic, processor types, micro-architectural conditions, events, enablement mechanisms, and the like are set forth in order to provide a more thorough understanding of embodiments of the present invention. It will be appreciated, however, by one skilled in the art that the invention may be practiced without such specific details. Additionally, some well known structures, circuits, and the like have not been shown in detail to avoid unnecessarily obscuring embodiments of the present invention.

Although the following embodiments are described with reference to a processor, other embodiments are applicable to other types of integrated circuits and logic devices. Similar techniques and teachings of embodiments of the present invention can be applied to other types of circuits or semiconductor devices that can benefit from higher pipeline throughput and improved performance. The teachings of embodiments of the present invention are applicable to any processor or machine that performs data manipulations. However, the present invention is not limited to processors or machines that perform 512 bit, 256 bit, 128 bit, 64 bit, 32 bit, or 16 bit data operations and can be applied to any processor and machine in which manipulation or management of data is performed. In addition, the following description provides examples, and the accompanying drawings show various examples for the purposes of illustration. However, these examples should not be construed in a limiting sense as they are merely intended to provide examples of embodiments of the present invention rather than to provide an exhaustive list of all possible implementations of embodiments of the present invention.

Although the below examples describe instruction handling and distribution in the context of execution units and logic circuits, other embodiments of the present invention can be accomplished by way of a data or instructions stored on a machine-readable, tangible medium, which when performed by a machine cause the machine to perform functions consistent with at least one embodiment of the invention. In one embodiment, functions associated with embodiments of the present invention are embodied in machine-executable instructions. The instructions can be used to cause a general-purpose or special-purpose processor that is programmed with the instructions to perform the steps of the present invention. Embodiments of the present invention may be provided as a computer program product or software which may include a machine or computer-readable medium having stored thereon instructions which may be used to program a computer (or other electronic devices) to perform one or more operations according to embodiments of the present invention. Alternatively, steps of embodiments of the present invention might be performed by specific hardware components that contain fixed-function logic for performing the steps, or by any combination of programmed computer components and fixed-function hardware components.

Instructions used to program logic to perform embodiments of the invention can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

In modern processors, a number of different execution units are used to process and execute a variety of code and instructions. Not all instructions are created equal as some are quicker to complete while others can take a number of clock cycles to complete. The faster the throughput of instructions, the better the overall performance of the processor. Thus it would be advantageous to have as many instructions execute as fast as possible. However, there are certain instructions that have greater complexity and require more in terms of execution time and processor resources. For example, there are floating point instructions, load/store operations, data moves, etc.

As more computer systems are used in internet, text, and multimedia applications, additional processor support has been introduced over time. In one embodiment, an instruction set may be associated with one or more computer architectures, including data types, instructions, register architecture, addressing modes, memory architecture, interrupt and exception handling, and external input and output (I/O).

In one embodiment, the instruction set architecture (ISA) may be implemented by one or more micro-architectures, which includes processor logic and circuits used to implement one or more instruction sets. Accordingly, processors with different micro-architectures can share at least a portion of a common instruction set. For example, Intel® Pentium 4 processors, Intel® Core™ processors, and processors from Advanced Micro Devices, Inc. of Sunnyvale Calif. implement nearly identical versions of the x86 instruction set (with some extensions that have been added with newer versions), but have different internal designs. Similarly, processors designed by other processor development companies, such as ARM Holdings, Ltd., MIPS, or their licensees or adopters, may share at least a portion a common instruction set, but may include different processor designs. For example, the same register architecture of the ISA may be implemented in different ways in different micro-architectures using new or well-known techniques, including dedicated physical registers, one or more dynamically allocated physical registers using a register renaming mechanism (e.g., the use of a Register Alias Table (RAT), a Reorder Buffer (ROB) and a retirement register file. In one embodiment, registers may include one or more registers, register architectures, register files, or other register sets that may or may not be addressable by a software programmer.

In one embodiment, an instruction may include one or more instruction formats. In one embodiment, an instruction format may indicate various fields (number of bits, location of bits, etc.) to specify, among other things, the operation to be performed and the operand(s) on which that operation is to be performed. Some instruction formats may be further broken defined by instruction templates (or sub formats). For example, the instruction templates of a given instruction format may be defined to have different subsets of the instruction format's fields and/or defined to have a given field interpreted differently. In one embodiment, an instruction is expressed using an instruction format (and, if defined, in a given one of the instruction templates of that instruction format) and specifies or indicates the operation and the operands upon which the operation will operate.

Scientific, financial, auto-vectorized general purpose, RMS (recognition, mining, and synthesis), and visual and multimedia applications (e.g., 2D/3D graphics, image processing, video compression/decompression, voice recognition algorithms and audio manipulation) may require the same operation to be performed on a large number of data items. In one embodiment, Single Instruction Multiple Data (SIMD) refers to a type of instruction that causes a processor to perform an operation on multiple data elements. SIMD technology may be used in processors that can logically divide the bits in a register into a number of fixed-sized or variable-sized data elements, each of which represents a separate value. For example, in one embodiment, the bits in a 64-bit register may be organized as a source operand containing four separate 16-bit data elements, each of which represents a separate 16-bit value. This type of data may be referred to as 'packed' data type or 'vector' data type, and operands of this data type are referred to as packed data operands or vector operands. In one embodiment, a packed data item or vector may be a sequence of packed data elements stored within a single register, and a packed data operand or a vector operand may a source or destination operand of a SIMD instruction (or 'packed data instruction' or a 'vector instruction'). In one embodiment, a SIMD instruction specifies a single vector operation to be performed on two source vector operands to generate a destination vector operand (also referred to as a result vector operand) of the same or different size, with the same or different number of data elements, and in the same or different data element order.

SIMD technology, such as that employed by the Intel® Core™ processors having an instruction set including x86, MMX™, Streaming SIMD Extensions (SSE), SSE2, SSE3, SSE4.1, and SSE4.2 instructions, ARM processors, such as the ARM Cortex® family of processors having an instruction set including the Vector Floating Point (VFP) and/or NEON instructions, and MIPS processors, such as the Loongson family of processors developed by the Institute of Computing Technology (ICT) of the Chinese Academy of Sciences, has enabled a significant improvement in application performance (Core™ and MMX™ are registered trademarks or trademarks of Intel Corporation of Santa Clara, Calif.).

In one embodiment, destination and source registers/data are generic terms to represent the source and destination of the corresponding data or operation. In some embodiments, they may be implemented by registers, memory, or other storage areas having other names or functions than those depicted. For example, in one embodiment, "DEST1" may be a temporary storage register or other storage area, whereas "SRC1" and "SRC2" may be a first and second source storage register or other storage area, and so forth. In other embodiments, two or more of the SRC and DEST storage areas may correspond to different data storage elements within the same storage area (e.g., a SIMD register). In one embodiment, one of the source registers may also act as a destination register by, for example, writing back the result of an operation performed on the first and second source data to one of the two source registers serving as a destination registers.

FIG. 1A is a block diagram of an exemplary computer system formed with a processor that includes execution units to execute an instruction in accordance with one embodiment of the present invention. System 100 includes a component, such as a processor 102 to employ execution units including logic to perform algorithms for process data, in accordance with the present invention, such as in the embodiment described herein. System 100 is representative of processing systems based on the PENTIUM® III, PENTIUM® 4, Xeon™, Itanium®, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 100 may execute a version of the WINDOWS™ operating system available from Microsoft Corporation of Redmond, Wash., although other operating systems (UNIX and Linux for example), embedded software, and/or graphical user interfaces, may also be used. Thus, embodiments of the present invention are not limited to any specific combination of hardware circuitry and software.

Embodiments are not limited to computer systems. Alternative embodiments of the present invention can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

FIG. 1A is a block diagram of a computer system 100 formed with a processor 102 that includes one or more execution units 108 to perform an algorithm to perform at least one instruction in accordance with one embodiment of the present invention. One embodiment may be described in the context of a single processor desktop or server system, but alternative embodiments can be included in a multiprocessor system. System 100 is an example of a 'hub' system architecture. The computer system 100 includes a processor 102 to process data signals. The processor 102 can be a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 102 is coupled to a processor bus 110 that can transmit data signals between the processor 102 and other components in the system 100. The elements of system 100 perform their conventional functions that are well known to those familiar with the art.

In one embodiment, the processor 102 includes a Level 1 (L1) internal cache memory 104. Depending on the architecture, the processor 102 can have a single internal cache or multiple levels of internal cache. Alternatively, in another embodiment, the cache memory can reside external to the processor 102. Other embodiments can also include a combination of both internal and external caches depending on the particular implementation and needs. Register file 106 can store different types of data in various registers including integer registers, floating point registers, status registers, and instruction pointer register.

Execution unit 108, including logic to perform integer and floating point operations, also resides in the processor 102. The processor 102 also includes a microcode (ucode) ROM that stores microcode for certain macroinstructions. For one embodiment, execution unit 108 includes logic to handle a packed instruction set 109. By including the packed instruction set 109 in the instruction set of a general-purpose processor 102, along with associated circuitry to execute the instructions, the operations used by many multimedia applications may be performed using packed data in a general-purpose processor 102. Thus, many multimedia applications can be accelerated and executed more efficiently by using the full width of a processor's data bus for performing operations on packed data. This can eliminate the need to transfer smaller units of data across the processor's data bus to perform one or more operations one data element at a time.

Alternate embodiments of an execution unit 108 can also be used in micro controllers, embedded processors, graphics devices, DSPs, and other types of logic circuits. System 100 includes a memory 120. Memory 120 can be a dynamic random access memory (DRAM) device, a static random access memory (SRAM) device, flash memory device, or other memory device. Memory 120 can store instructions and/or data represented by data signals that can be executed by the processor 102.

A system logic chip 116 is coupled to the processor bus 110 and memory 120. The system logic chip 116 in the illustrated embodiment is a memory controller hub (MCH). The processor 102 can communicate to the MCH 116 via a processor bus 110. The MCH 116 provides a high bandwidth memory path 118 to memory 120 for instruction and data storage and for storage of graphics commands, data and textures. The MCH 116 is to direct data signals between the processor 102, memory 120, and other components in the system 100 and to bridge the data signals between processor bus 110, memory 120, and system I/O 122. In some embodiments, the system logic chip 116 can provide a graphics port for coupling to a graphics controller 112. The MCH 116 is coupled to memory 120 through a memory interface 118. The graphics card 112 is coupled to the MCH 116 through an Accelerated Graphics Port (AGP) interconnect 114.

System 100 uses a proprietary hub interface bus 122 to couple the MCH 116 to the I/O controller hub (ICH) 130. The ICH 130 provides direct connections to some I/O devices via a local I/O bus. The local I/O bus is a high-speed I/O bus for connecting peripherals to the memory 120, chipset, and processor 102. Some examples are the audio controller, firmware hub (flash BIOS) 128, wireless transceiver 126, data storage 124, legacy I/O controller containing user input and keyboard interfaces, a serial expansion port such as Universal Serial Bus (USB), and a network controller 134. The data storage device 124 can comprise a hard disk drive, a floppy disk drive, a CD-ROM device, a flash memory device, or other mass storage device.

For another embodiment of a system, an instruction in accordance with one embodiment can be used with a system on a chip. One embodiment of a system on a chip comprises of a processor and a memory. The memory for one such system is a flash memory. The flash memory can be located on the same die as the processor and other system components. Additionally, other logic blocks such as a memory controller or graphics controller can also be located on a system on a chip.

FIG. 2 is a simplified block diagram of a processor 200 in accordance with an embodiment of the present invention. The processor 200 may include a chipset 210, a variable clock 230, a fixed clock 240, and a CPU 250. The chipset 210 may include a platform control hub time-stamp counter (PCH-TSC) 212. The CPU 250 may include a slow counter 252, a fast counter 254, a normalizing unit 256, an adder 258, and a TSC 260.

The fixed clock 240 may be provided as a crystal oscillator or may be provided as a direct or indirect connection to a crystal oscillator. Hence, the fixed clock 240 may be classified as a stable, un-spread clock. The fixed clock 240 signal may be provided to various processor components in the chipset 210 and CPU 250. In a client-side implementation, the fixed clock 240, for example, may operate at 24 MHz, and in a server-side implementation, the fixed clock 240, for example, may operate at 25 MHz. The fixed clock 240 may generate a fixed clock signal.

The variable clock 230 may be provided as a spread clock where the clock frequency may be adjusted "on the fly." Hence, the variable clock 230 may be classified as an unstable clock. The variable clock 230 signal may be provided to the CPU 250 to provide different frequencies based on operational states of the CPU 250. In an embodiment, the variable clock 230 may be derived from the fixed clock 240 via frequency multipliers (not shown), frequency dividers (not shown), or the like. The variable clock 230 may typically be operated at a faster frequency than the fixed clock 240. For example, the variable clock 230 may operate at 100 MHz while the fixed clock 240 may operate at 24 MHz. The variable clock 230 may generate a variable clock signal.

The PCH-TSC 212 in the chipset 210 may be based on the fixed clock 240 (i.e., crystal clock). The PCH-TSC 212 may provide time-stamp count values for the chipset and provide a reference count value for the CPU 250. For example, the PCH-TSC may be a 64 bit counter. The chipset 210 may also include various other known components (not shown) to perform algorithms to process data, in accordance with the present invention.

The CPU 250 may include core and uncore components. The CPU 550 may also include various other known components (not shown) to perform algorithms to process data, in accordance with the present invention. The CPU 250 may receive the variable clock signal, the fixed clock (crystal clock) signal, and the PCH-TSC count value. In an embodiment, the CPU 250 may operate in a variety of different operational states such as P-state, C-state, and T-state. For example, the CPU 250 may operate in normal operational states such as P-state, in power savings operational states such as C-state, or in condition dependent state such as T-state for temperature dependent states. C-state operations may be at lower clock speeds for sleep mode and the like. T-state operations may be at lower clock speeds for thermal reasons such as overheating and the like. The variable clock 230 may provide the different clock speeds for the CPU based on the CPU's operational state because the variable clock 230 may be changed on the fly as described above.

The slow counter 252 may be based on the crystal clock and may download the PCH-TSC value from the PCH-TSC 212 at operational state change times. For example, upon the CPU 250 waking up from sleep mode, the slow counter 252 may download the PCH-TSC value since the chipset 210 presumably was in operation for at least a portion of the time the CPU 250 was in sleep mode. The PCH-TSC value may be a reference value for the slow counter 252.

The fast counter 252 may be based on the variable clock 230. As described above, the variable clock 230 may be changing over time, and thus the fast counter's operations may be based on the variable clock's 230 changing frequency. The fast counter 252 may also include a reset input. In an embodiment, the reset input may be controlled by the crystal clock. For example, the fast counter 252 may reset at every complete cycle of the fixed clock 240. The normalizing unit 256 may normalize the fast counter 254 operations to ensure fixed factor counting by the fixed counter 254. In an embodiment, the fast counter 254, for example, may be an eight bit counter.

The adder 258 may combine the slow counter 252 output and the fast counter 254 output. The combined value may be stored in the TSC 260. Of course, in an embodiment, the combining of the slow counter 252 and the fast counter 254 may be integrated into the TSC 260. The TSC 260 may store the CPU TSC value (the combination of the fast counter and slow counter outputs). The CPU 250 may read the TSC 260 via a read instruction for various applications being executed by the processor 200.

FIG. 3 illustrates a graph of the slow counter 252 output, the fast counter 254 output, and the TSC 260 value in accordance with an embodiment of the present invention. The slow counter output may correspond to clock cycles of the crystal clock, which may be a stable clock. The fast counter output may correspond to clock cycles of the variable clock, which may be an unstable clock, and the fast counter output may be reset at every clock cycle of the crystal clock. As shown and described above, the TSC value may correspond to the sum of the fast and slow counter outputs. Thus, accuracy of the TSC 260 may be greatly increased as compared to conventional systems and may provide improved coherent counting between components such as the chipset and the CPU. Moreover, TSC reads of the TSC 260 may provide more accurate monotonically increasing unique value whenever reads are executed.

Figure 4:
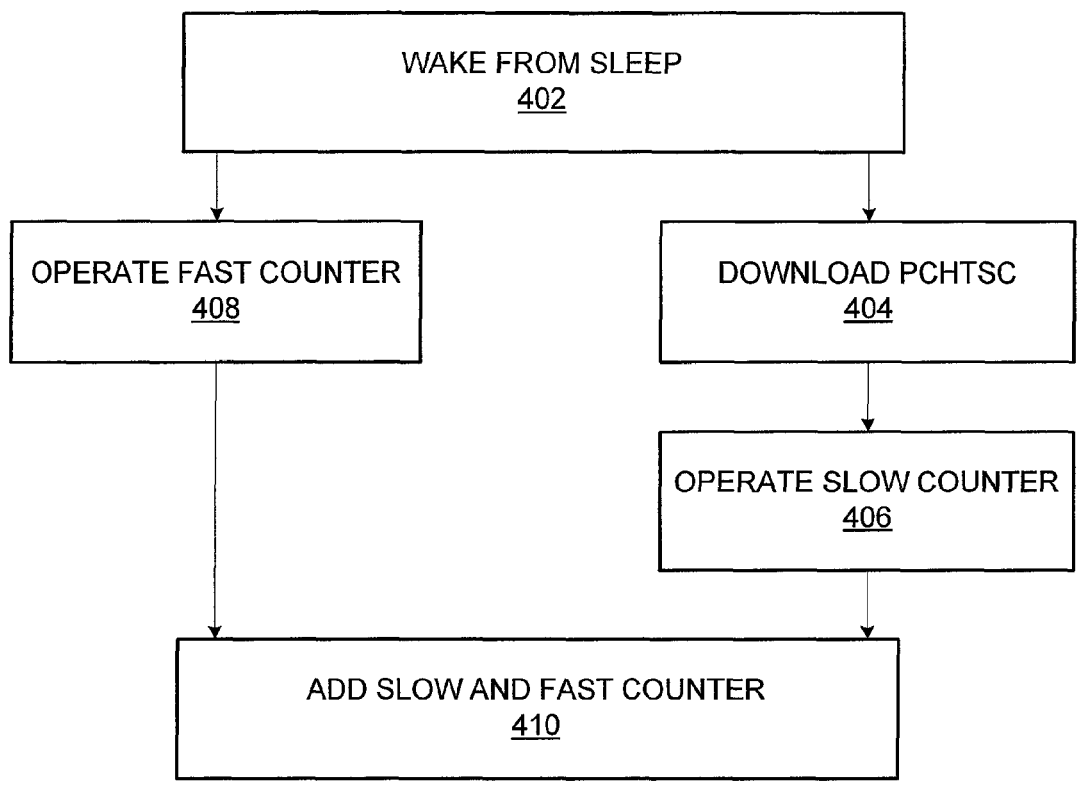
FIG. 4 is a simplified process flow of a time keeping operation according to an embodiment of the present invention.

FIG. 4 illustrates a simplified process flow diagram of a timekeeping operation as executed by the processor 200 in accordance with an embodiment of the present invention. In step 402, the CPU 250 may wake from sleep mode or may transition from one operational state to another operational state. If the CPU 250 was previously in sleep mode, the slow and fast counters 252, 254 presumably were non-operational during sleep mode.

In step 404, the slow counter 252 may download the PCH-TSC value from the PCH-TSC 212 since the PCH-TSC 212 was presumably operating for at least a portion of time the CPU 250 was in sleep mode. The downloaded PCH-TSC value may be a reference value for the slow counter 252 to correlate the CPU 250 and the chipset 210. With the downloaded PCH-TSC value, the slow counter 252 may start its counter based on the crystal clock in step 406. The slow counter 252 may increment its count value by one at each cycle of the crystal clock.

In step 408, which may be in parallel with the slow counter operations, the fast counter 254 may begin its operation upon CPU 250 waking up too. The fast counter 252 may be based on the variable clock 230 and, thus, may increment its count value (by 0, 1, or more depending on the normalizing unit 256) at each cycle of the variable clock 230. However, at every crystal clock cycle, the fast counter 254 may be reset. Moreover, the fast counter value may be normalized by the normalizing unit 256. Normalizing may correspond to adjusting the fast count value to account for changes in frequency of the variable clock 230. For example, although the variable clock frequency may be changed on the fly, the fast count value may be normalized to reach a defined value at every crystal clock cycle. Thus, the fast count value may approach the defined value before the fast counter is reset at every crystal clock cycle.

In step 410, the slow count and fast count values may be combined to generate the TSC value. The TSC value may then be available for use by various components such as operating systems and applications.

Figure 5:
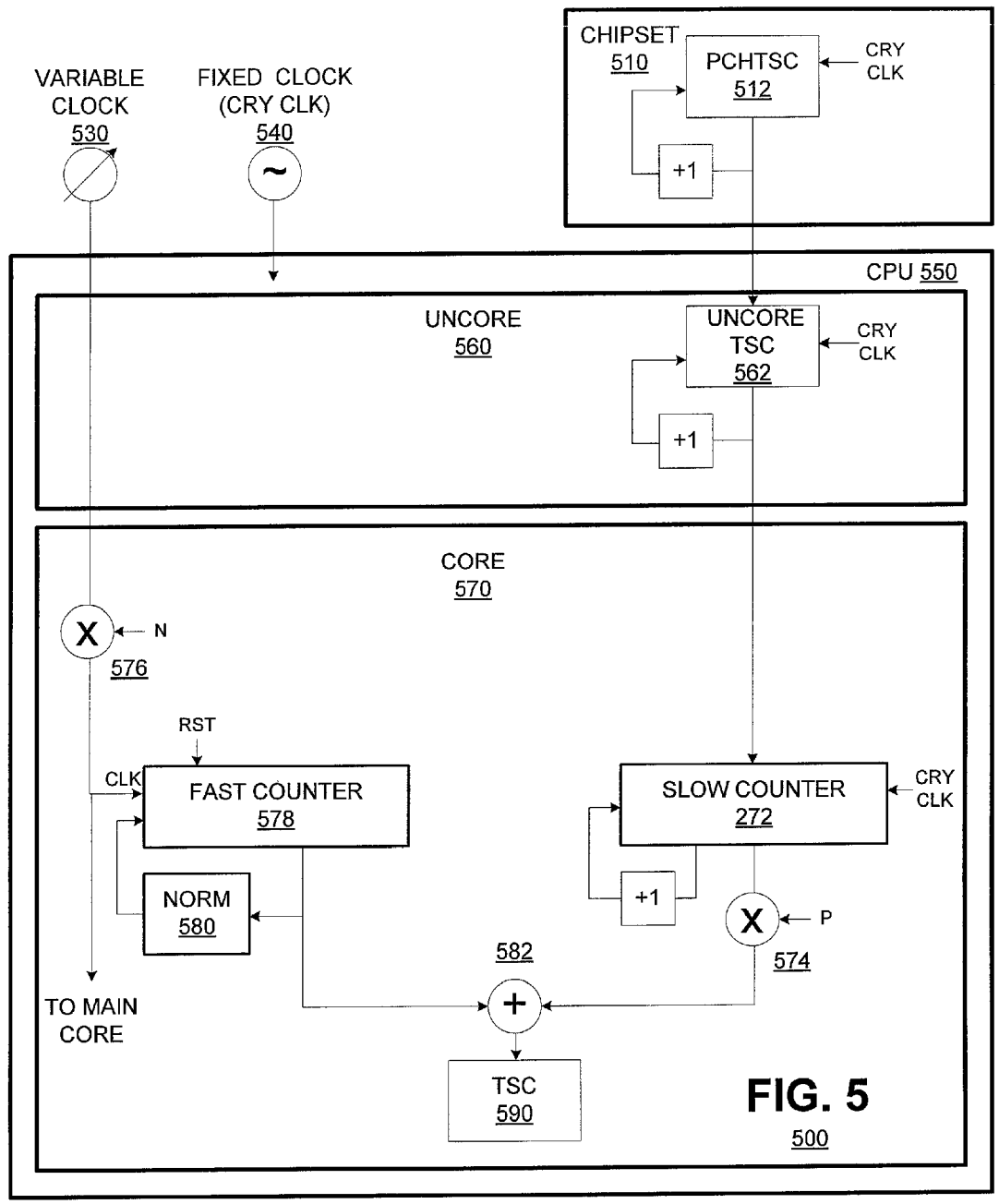
FIG. 5 illustrates a simplified block diagram of a processor according to an embodiment of the present invention.

FIG. 5 is a simplified block diagram of a processor 500 in accordance with an embodiment of the present invention. The processor 500 may include a chipset 510, a variable clock 530, a fixed clock 540, and a CPU 550. The chipset 510 may include a platform control hub time-stamp counter (PCH-TSC) 512. The CPU 550 may have an uncore section 560 and a core section 570. The uncore section 560 may include an uncore TSC 562. The core section 570 may include a slow counter 572, a P multiplier 574, a N multiplier 576, a fast counter 578, a normalizing unit 580, an adder 582, and a TSC 590.

The fixed clock 540 may be provided as a crystal oscillator or may be provided as a direct or indirect connection to a crystal oscillator. Hence, the fixed clock 540 may be classified as a stable, un-spread clock. The fixed clock 540 signal may be provided to various processor components in the chipset 510 and CPU 550. In a client-side implementation, the fixed clock 540, for example, may operate at 24 MHz, and in a server-side implementation, the fixed clock 540, for example, may operate at 25 MHz. The fixed clock 240 may generate a fixed clock signal.

The variable clock 530 may be provided as a spread clock where the clock frequency may be adjusted on the fly. Hence, the variable clock 530 may be classified as an unstable clock. The variable clock 530 signal may be provided to the CPU 550 to provide different frequencies based on operational states of the CPU 550. In an embodiment, the variable clock 530 may be derived from the fixed clock 540 via frequency multipliers (not shown), frequency dividers (not shown), or the like. The variable clock 530 may typically operate at a faster frequency than the fixed clock 540. For example, the variable clock 530 may operate at 100 MHz while the fixed clock 540 may operate at 24 MHz. The variable clock 230 may generate a variable clock signal.

The PCH-TSC 512 in the chipset 510 may be based on the fixed clock 240 (i.e., crystal clock). The PCH-TSC 512 may provide time-stamp count values for the chipset and provide a reference count value for the CPU 550. For example, the PCH-TSC may be a 64 bit counter. The chipset 510 may also include various other known components (not shown) to perform algorithms to process data, in accordance with the present invention.

The CPU 550 may include core and uncore sections 560, 570. The CPU 550 may also include various other known components (not shown) to perform algorithms to process data, in accordance with the present invention. The CPU 550 may receive the variable clock signal, the fixed clock (crystal clock) signal, and the PCH-TSC count value. In an embodiment, the CPU 550 may operate in a variety of different operational states such as P-state, C-state, and T-state. For example, the CPU 550 may operate in normal operational states such as P-state, in power savings operational states such as C-state, or in condition dependent state such as T-state for temperature dependent states. C-state operations may be at lower clock speeds for sleep mode and the like. T-state operations may be at lower clock speeds for thermal reasons such as overheating and the like. The variable clock 530 may provide the different clock speeds for the CPU based on the CPU's operational state because the variable clock 530 may be changed on the fly as described above. Furthermore, the uncore and core sections 560, 570 may operate in different operational states simultaneously. For example, the uncore section 560 may wake up from sleep mode first while the core section 570 may still be in sleep mode.

The uncore TSC 562 may be based on the crystal clock and may download the PCH-TSC value from the PCH-TSC 512 at operational state change times. For example, upon the uncore section 560 of the CPU 550 waking up from sleep mode, the uncore TSC 562 may download the PCH-TSC value since the chipset 510 presumably was in operation for at least a portion of the time the CPU 550 (uncore section 560) was in sleep mode. The PCH-TSC value may be a reference value for the slow counter 252. The uncore TSC 562 may generate an uncore reference timing (URT) value based on the PCH-TSC value and the crystal clock.

The slow counter 572 may be based on the crystal clock and may download the URT value from the uncore TSC 562 at operational state change times. For example, upon the core section 570 of the CPU 550 waking up from sleep mode, the slow counter 572 may download the URT value since the uncore section 560 presumably woke from sleep mode before the core section 570. The URT value may be a reference value for the slow counter 572. The slow counter 572 may generate an core timing counter (CTC) value based on the URT value and the crystal clock. The slow counter 572 output may be coupled to a multiplier 574, which may multiply the slow count value by a P factor. The P factor may be dynamically programmable.

The variable clock signal may be spread to the core components via multiplier 576, which may multiply the variable clock signal with a N factor. The N factor may be dynamically programmable. The fast counter 578 may be based on the N* variable clock signal. As described above, the variable clock 530 may be changing over time, and thus the fast counter's operations may be based on the variable clock's changing frequency. The fast counter 578 may also include a reset input. In an embodiment, the reset input may be controlled by the crystal clock. For example, the fast counter 578 may reset at every complete cycle of the fixed clock 540. The normalizing unit 580 may normalize the fast counter 578 operations to ensure fixed factor counting by the fixed counter 578. In an embodiment, the fast counter 578, for example, may be an eight bit counter.

The adder 582 may combine the N multiplied slow counter 572 output and the fast counter 578 output. The combined value may be stored in the TSC 260. Of course, in an embodiment, the combining of the N multiplied slow counter 572 and the fast counter 574 may be integrated into the TSC 590. The TSC 590 may store the CPU TSC value (the combination of the fast counter and slow counter outputs). The CPU 550 may read the TSC 590 via a read instruction for various applications being executed by the processor 500.

Figure 6:
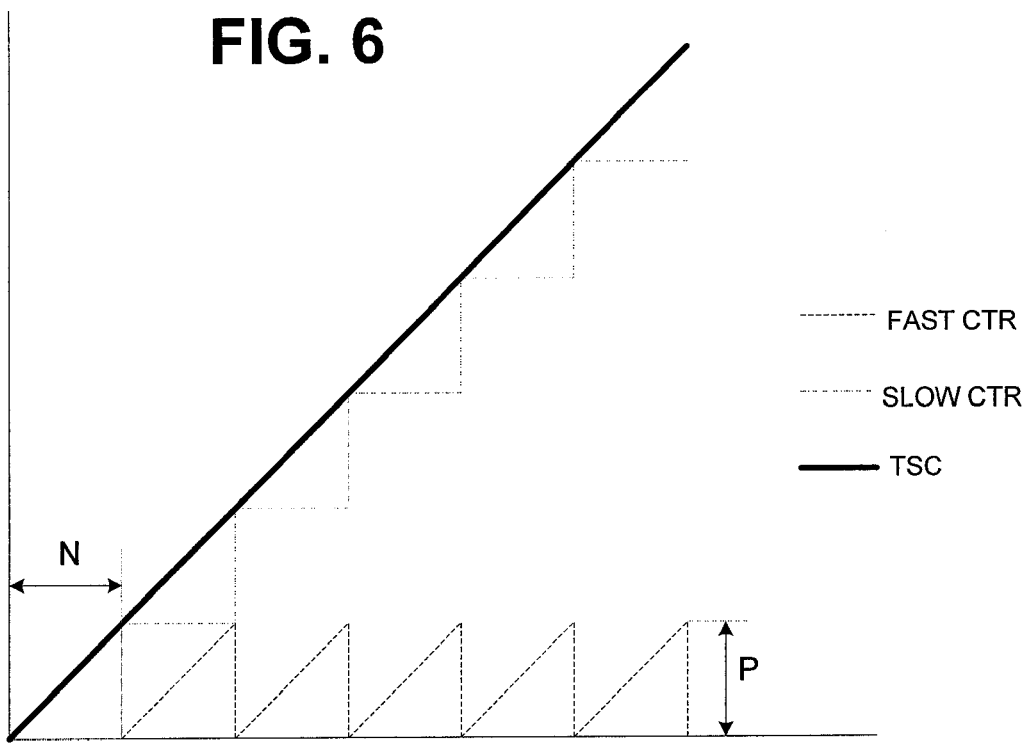
FIG. 6 illustrates exemplary counter signals according to an embodiment of the present invention.

FIG. 6 illustrates a graph of the slow counter 572 output, the fast counter 574 output, and the TSC 590 value in accordance with an embodiment of the present invention. The slow counter output may correspond to clock cycles of the crystal clock, which may be a stable clock. The slow counter output may also be scaled by P. The fast counter output may correspond to clock cycles of the variable clock, which may be an unstable clock, and the fast counter output may be reset at every clock cycle of the crystal clock. Further, the fast counter clock may be scaled by factor N. As shown and described above, the TSC value may correspond to the sum of the fast and slow counter outputs. Thus, accuracy of the TSC 590 may be greatly increased as compared to conventional systems and may provide improved coherent counting between components such as the chipset and the CPU. Moreover, TSC reads of the TSC 590 may provide more accurate monotonically increasing unique value whenever reads are executed.

Figure 7:
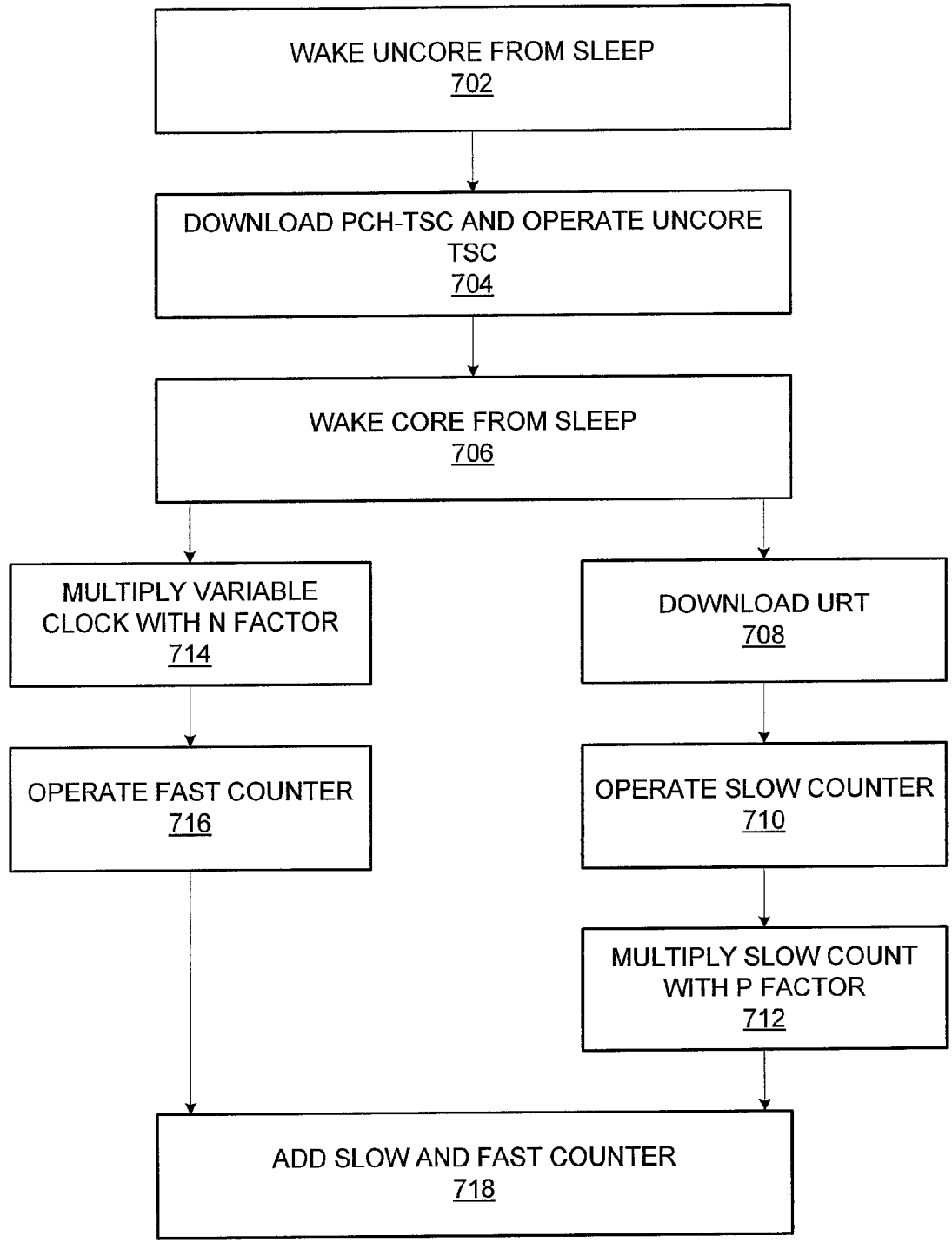
FIG. 7 is a simplified process flow of a time keeping operation according to an embodiment of the present invention.

FIG. 7 illustrates a simplified process flow diagram of a timekeeping operation as executed by the processor 500 in accordance with an embodiment of the present invention. In step 702, the uncore section 560 of the CPU 550 may wake from sleep mode or may transition from one operational state to another operational state. If the entire CPU 550 was previously in sleep mode, the uncore TSC 562 and the slow and fast counters 572, 578 presumably were non-operational during sleep mode.

In step 704, the uncore TSC 562 may download the PCH-TSC value from the PCH-TSC 512 since the PCH-TSC 512 was presumably operating for at least a portion of time the uncore section 560 was in sleep mode. The downloaded PCH-TSC value may be a reference value for the uncore TSC 562 to correlate the CPU 550 and the chipset 510. With the downloaded PCH-TSC value, the uncore TSC 562 may start its counter based on the crystal clock in. The uncore TSC 562 may increment its count value by one at each cycle of the crystal clock thereby generating the URT value.

In step 706, the core section 570 of the CPU 550 may wake from sleep mode or may transition from one operational state to another operational state. If the core section 570 was previously in sleep mode, the slow and fast counters 572, 578 presumably may have been non-operational during sleep mode.

In step 708, the slow counter 572 may download the URT value from the uncore TSC 562 since the uncore TSC 562 presumably woke up before the core section 570. With the downloaded URT value, the slow counter 572 may start its counter based on the crystal clock in step 710. The slow counter 252 may increment its count value by one at each cycle of the crystal clock thereby generating the CTC value. In step 712, the CTC value (slow count value) may be multiplied by the P factor via multiplier 574. The P factor may be programmed to a fixed factor to ensure that the CTC value step size is consistent (i.e., counting ¼₄ for a 24 MHz crystal clock).

In step 714, which may be in parallel with the slow counter operations (steps 708-712), the variable clock signal may be multiplied by the N factor via multiplier 576. The N factor may programmed based on the operational state of the core section and its desired operational frequency.

In step 716, the fast counter 578 may begin its operation upon the core section 570 waking up too. The fast counter 578 may be based on the variable clock 530 (N multiplied variable clock signal) and, thus, may increment its count value (by 0, 1, or more depending on the normalizing unit 580) at each cycle of the variable clock 530. However, at every crystal clock cycle, the fast counter 578 may be reset. Moreover, the fast counter value may be normalized by the normalizing unit 580. Normalizing may correspond to adjusting the fast count value to account for changes in frequency of the variable clock 530. For example, although the variable clock frequency may be changed on the fly, the fast count value may be normalized to reach a defined value at every crystal clock cycle. Thus, the fast count value may approach the define value before the fast counter is reset at every crystal clock cycle.

In step 718, the slow count (P multiplied) and fast count values may be combined to generate the TSC value. The TSC value may then be available for use by various components such as operating systems and applications.

Embodiments of the present invention may be implemented in a computer system. Embodiments of the present invention may also be implemented in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), a system on a chip, network computers (NetPC), set-top boxes, network hubs, wide area network (WAN) switches, or any other suitable system.

Embodiments may be implemented in code and may be stored on a storage medium having stored thereon instructions which can be used to program a system to perform the instructions. The storage medium may include, but is not limited to, any type of disk including floppy disks, optical disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A system, comprising:
a fixed clock to provide a fixed clock signal;
a variable clock to provide a variable clock signal;
a chipset to include a chipset time stamp counter (TSC) based on the fixed clock signal;
a processor, comprising:
a fast counter to be based on the variable clock signal and to generate a fast count value;
a slow counter to download a time stamp value based on the chipset TSC at wakeup and based on the fixed clock signal and to generate a slow count value; and
a central TSC to combine the fast count value and slow count value to generate a central TSC value.

2. The system of claim 1, wherein the fast counter is to receive a reset signal based on the fixed clock signal.

3. The system of claim 1, further comprises a normalization unit coupled to the fast counter.

4. The system of claim 1, wherein the fast counter, slow counter, and central TSC are provided in a central processing unit (CPU) core.

5. The system of claim 4, further comprises an uncore TSC coupled to the chipset TSC and configured to provide the time stamp value to the slow counter.

6. The system of claim 1, further comprising at least one multiplier.

7. A processor, comprising:
   a fixed clock signal input to receive a fixed clock signal;
   a variable clock signal input to receive a variable clock signal;
   a fast counter configured to be based on the variable clock signal and to generate a fast count value;
   a slow counter configured to be based on the fixed clock signal, to download a reference value based on a chipset time stamp counter (TSC) value, and to generate a slow count value;
   a TSC configured to combine the fast count value and the slow count value to generate a central TSC value.

8. The processor of claim 7, wherein the fast counter is further configured to receive a reset signal based on the fixed clock signal.

9. The processor of claim 7, further comprises a normalization unit coupled to the fast counter.

10. The processor of claim 7, wherein the fast counter, slow counter, and central TSC are provided in a core section of the CPU.

11. The processor of claim 10, further comprises an uncore TSC configured to provide the reference value to the slow counter.

12. The processor of claim 1, further comprising at least one multiplier.

13. A method, comprising:
   waking a CPU from sleep mode;
   downloading a chipset time stamp counter (TSC) value;
   operating a slow counter based on a fixed clock signal and also based on the chipset TSC value;
   in parallel with the slow counter operations, operating a fast counter based on a variable clock signal;
   combining results of the slow counter and the fast counter to generate a TSC value.

14. The method of claim 13, wherein operating the fast counter includes resetting the fast counter based on the fixed clock signal.

15. The method of claim 13, wherein operating the fast counter includes normalizing the fast counter result.

16. The method of claim 13, further comprising operating an uncore TSC based on the chipset TSC value.

17. The method of claim 13, further comprising multiplying the variable clock signal by a factor and providing the factor multiplied variable clock signal to core components of the CPU.

18. The method of claim 13, further comprising multiplying the slow counter result by a factor.

* * * * *